(12) United States Patent
Schoop et al.

(10) Patent No.: US 6,669,004 B1
(45) Date of Patent: Dec. 30, 2003

(54) TRANSPORTATION SYSTEM FOR TRANSPORTING OBJECTS

(75) Inventors: Ronald Schoop, Hainburg (DE); Siegfried Ralf Neubert, Aschaffenburg (DE); Eckart I. Tietze, Seligenstadt (DE)

(73) Assignee: Schneider Automation GmbH, Seligenstadt (DE)

( * ) Notice: Subject to any disclaimer, the term of this patent is extended or adjusted under 35 U.S.C. 154(b) by 95 days.

(21) Appl. No.: 09/625,414

(22) Filed: Jul. 25, 2000

(30) Foreign Application Priority Data

Jul. 28, 1999 (DE) ..................................... 299 13 154 U

(51) Int. Cl.[7] .............................................. B65G 29/00
(52) U.S. Cl. .................... 198/441; 198/450; 198/465.1
(58) Field of Search ............................. 198/465.1, 441, 198/450, 370.01

(56) References Cited

U.S. PATENT DOCUMENTS

| | | | |
|---|---|---|---|
| 3,237,759 A | * 3/1966 | Solski et al. | 198/465.1 |
| 3,770,107 A | 11/1973 | Michelbach | |
| 4,411,354 A | * 10/1983 | Thibault et al. | 198/472 |
| 4,567,822 A | * 2/1986 | Heidenreich et al. | 198/465.1 |
| 4,823,933 A | * 4/1989 | Hashimoto et al. | 198/465.3 |
| 6,217,274 B1 | * 4/2001 | Svyatsky et al. | 414/405 |

FOREIGN PATENT DOCUMENTS

| | | |
|---|---|---|
| DE | 2841115 | 3/1979 |
| DE | 4129672 | 3/1993 |
| DE | 19835322 | 2/2000 |
| FR | 2348125 | 11/1977 |
| GB | 1208965 | 10/1970 |
| JP | 06-255315 | * 11/1987 |

* cited by examiner

Primary Examiner—Jack Lavinder
Assistant Examiner—Bradley King
(74) Attorney, Agent, or Firm—Dennison, Schultz & Dougherty

(57) ABSTRACT

The invention relates to a transportation system (10) for transporting objects (WSx), in particular workpieces, including a plurality of parallel or substantially parallel transportation paths (12, 14, 16) and a device (18) for shifting the objects (WSx) between at least two adjacent transportation paths (12, 14, 16). In order to reduce both the space required for the transportation path and the time consumption for displacing the workpieces between the transportation paths, it is proposed that the transportation paths (12, 14, 16) are disposed one above the other in different planes, and that the workpieces (WSx) on being shifted are moved on a path (30) that defines a plane extending perpendicular or substantially perpendicular to the transportation paths (12, 14, 16).

8 Claims, 1 Drawing Sheet

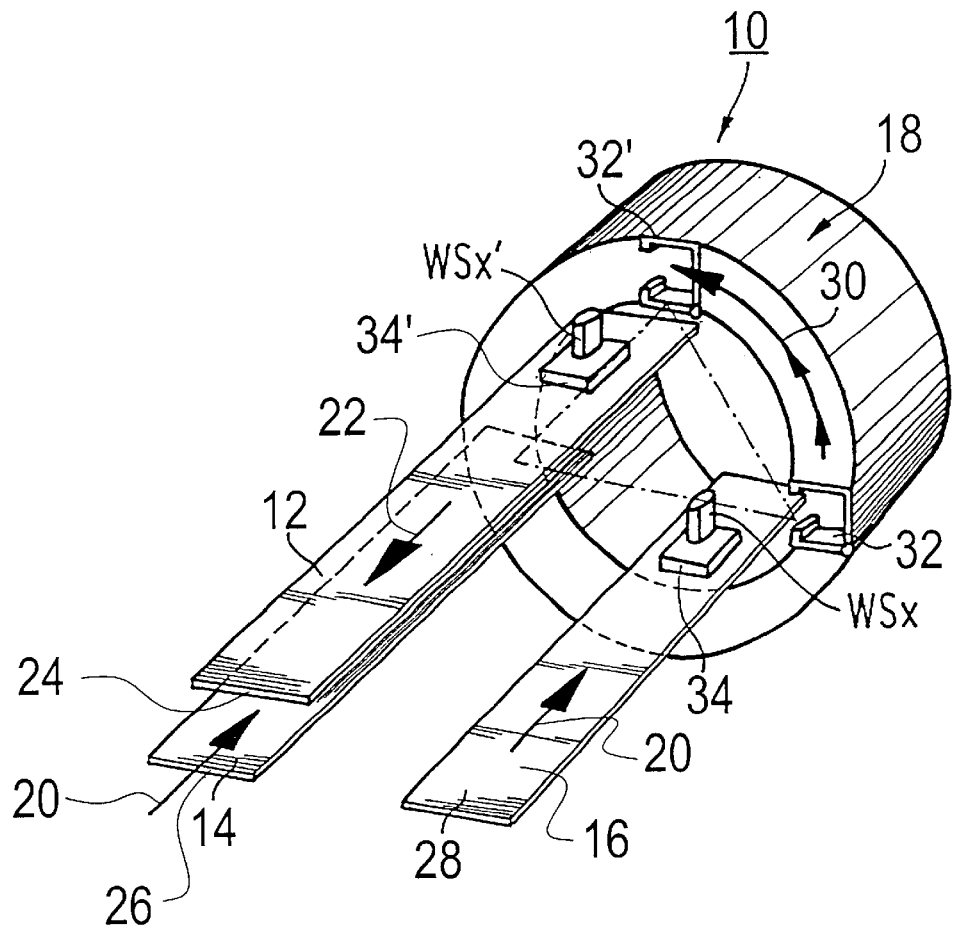

TRANSPORTATION SYSTEM FOR TRANSPORTING OBJECTS

FIELD OF THE INVENTION

The invention relates to a transportation system for transporting objects, in particular workpieces, including a plurality of parallel or substantially parallel transportation paths and a device for shifting the objects between at least two adjacent transportation paths.

BACKGROUND OF THE INVENTION

Such transportation systems are known, for transporting workpieces between processing machines. The transportation system is embodied as a displacement table, each with at least three virtually parallel roller paths, and at least two adjacent roller paths are disposed at the edge and run in the production direction, and at least one roller path extends counter to the production direction. The construction of the displacement tables between which the machine is disposed allows a circulation of the workpieces that because of the failure of one machine cannot be processed in the surroundings of this machine. A plurality of displacement tables are disposed in the production system, so that waiting loops are defined for the workpieces, and the waiting loops can have different lengths.

To enable the circulation of the workpieces, devices for shifting objects between at least two adjacent transportation paths are provided, which by way of example are embodied as gantries or transverse conveyors.

In the known transportation system, the parallel or substantially parallel transportation paths are disposed in a single plane, requiring increased space. As devices for shifting objects between at least two adjacent transportation paths, a transverse conveyor is provided, which means that when workpieces are displaced between the outer transportation paths, longer displacement times must be expected.

SUMMARY OF THE INVENTION

With this as the point of departure, the object of the present invention is to refine a transportation system of the type defined above such that both the space required for the transportation path and the time consumption for displacing the workpieces among the transportation paths are reduced.

This object is attained according to the invention in that the transportation paths are disposed one above the other in different planes, and that the workpieces on being shifted are moved on a path that defines a plane extending perpendicular or substantially perpendicular to the transportation paths.

The transportation system is distinguished in particular in that a compact structure is attained by the transportation paths disposed one above the other, since the width of the transportation system is reduced. A further advantage of the arrangement is attained because the distances between individual transportation paths are shortened, so that the time needed for shifting the workpieces is also reduced. In the shifting, the workpieces are moved along a path that defines a plane extending perpendicular or substantially perpendicular to center axes of the transportation paths.

An especially preferred embodiment is distinguished in that the transportation system includes at least three transportation paths, and at least two transportation paths are disposed side by side in a first plane and extend in the production direction, and at least one transportation path is disposed in a second plane and extends counter to the production direction, and the center axes of the transportation paths define the corners of an equilateral triangle. As a result, it is attained that the displacement distance transverse to the production direction between the individual transportation paths is constant and shortened. This precludes longer displacement distances between transportation paths located on the outside.

A further especially preferred embodiment provides that the device for shifting the objects between at least two adjacent transportation paths is embodied as a rotation element; the workpieces on being transported are moved along a circular path. In the above-described preferred arrangement of the transportation paths, a shift of a workpiece between adjacent transportation paths is effected by rotating the rotation element by an angle of preferably $\alpha=120°$, as a result of which very short shifting times are achieved. Means for receiving the workpieces are disposed on the rotation element and are embodied for example as gripper elements or as roller paths. Upon transportation of the workpieces along the described circular path, the workpieces maintain their original position.

Preferably, the rotation element is embodied in drumlike fashion and peripherally surrounds the transportation paths. The rotation element can itself be driven, or alternatively the possibility exists that the receptacles that receive the workpieces move independently along a circular path relative to the rigidly disposed rotation element.

Further details, advantages and characteristics of the invention will become apparent not only from the claims and the characteristics to be taken from them—individually and/or in combination—but also from the ensuing description of a preferred exemplary embodiment taken from the drawing.

BRIEF DESCRIPTION OF THE DRAWING

FIG. 1 schematically shows a transportation system for transporting workpieces according to the subject invention.

DETAILED DESCRIPTION OF A PREFERRED EMBODIMENT

The sole drawing FIGURE purely schematically shows one possible embodiment of the transportation system 10 for transporting workpieces WSx. The transportation system 10 includes a plurality of transportation paths 12, 14, 16 and a device 18 for shifting objects between the transportation paths 12, 14, 16.

According to the invention, the transportation paths 14 and 16 are disposed in a first (lower) plane, and they transport workpieces WSx in the direction of the arrow 20 (production direction). The transportation path 12 is disposed in a second (upper) plane above the transportation paths 14, 16 and transports workpieces WSx in the direction of the arrow 22, that is, contrary to the production direction. The transportation paths are disposed such that the center axes 24, 25, 28 of the transportation paths form corner points of an equilateral triangle.

Because of the symmetrical arrangement of the transportation paths 12, 14, 16, the spacings between the individual paths are constant, and as a result, short displacement or shifting times are attained overall.

According to the invention, the device 18 is embodied as a rotation element, and the workpieces WSx are transported along a path 30 that defines a plane which extends perpendicular to the transportation paths 12, 14, 16. When the workpiece WSx is shifted from the transportation path 16 to the transportation path 12, the workpiece is grasped by a receptacle 34 connected to the rotation element 18 and is moved by an angle α=120° in the direction of the path 30, so that the workpiece WSx can be set down on the transportation path 12. The receptacle 32 can be embodied as a gripper element or as a roller path. Preferably, at least three gripper elements 32 can be disposed at equal spacings along the circumference of the rotation element 18, so that a plurality of workpieces WSx can also be transferred simultaneously.

In the exemplary embodiment shown, the workpieces WSx are disposed on workpiece carriers 34, which are also received by the receptacles 32. The rotation element 18 is drumlike in embodiment and surrounds the transportation paths 12, 14, 16 peripherally. The receptacles 32 can be solidly joined to the rotation element 18, and then the rotation element 18 is driven independently. The rotation element 18 can also, as a retaining element, be disposed rigidly, and then the receptacle 32 moves independently along a circular path inside the rotation element. In each case, it is assured that the workpieces WSx will maintain their original position while being transported along the path 30.

What is claimed is:

1. A transportation system (10) for transporting workpiece objects (WSx) comprising a plurality of parallel or substantially parallel transportation paths (12, 14, 16) and a drum-configured rotation element peripherally surrounding the transportation paths (12, 14, 16) for shifting the workpiece objects (WSx) between at least two adjacent transportation paths (12, 14, 16), wherein at least one of the transportation paths (12, 14, 16) is above the other transportation paths in a different plane, and wherein the workpieces (WSx) are moved on a circular path (30) that defines a plane extending perpendicular or substantially perpendicular to the transportation paths (12, 14, 16), the drum-configured rotation element comprises a plurality of means for receiving the workpieces which are driven and movable relative to the drum-configured rotation element, said plurality of means for receiving the workpieces are connected to the rotation element so that the received workpieces (WSx) maintain their relative position to the horizontal while being transported along the circular path (30).

2. The plurality of parallel or substantially parallel transportation system (10) of claim 1, characterized in that the transportations paths (10) comprises three transportation paths (12, 14, 16), and wherein the at least two transportation paths (14, 16) are disposed side by side in a first plane and extend in a production direction, and wherein the at least one of the transportation paths (12) is disposed in a second plane and extends counter to the production direction, and the center axes (24, 26, 28) of the three transportation paths (12, 16, 18) define corners of an equilateral triangle.

3. The transportation system (10) of claim 1,
characterized in that
the workpiece (WSx) on being transported is moved along a circular path (30).

4. The transportation system (10) of claim 1, characterized in that a shift of the workpiece (WSx) between adjacent transportation paths (12, 16) is effected by rotating the rotation element (18) by an angle α, wherein α=+120°.

5. The transportation system (10) of claim 1, characterized in that the means (32) for receiving the workpieces (WSx) are distributed uniformly on the circumference of the rotation element (18).

6. The transportation system (10) of claim 5,
characterized in that
the means (32) for receiving the workpieces (WSx) is embodied as a gripper element and/or as a roller path.

7. The transportation system (10) of claim 1, characterized in that the rotation element (18) is driven.

8. The transportation system (10) of claim 5,
characterized in that
the means (32) for receiving the workpieces WSx are driven.

* * * * *